US00RE35498E

United States Patent [19]

Barnard

[11] E Patent Number: Re. 35,498

[45] Reissued Date of Patent: Apr. 29, 1997

[54] VEHICLE LOCATION SYSTEM

[75] Inventor: Michael E. Barnard, Reigate, United Kingdom

[73] Assignee: U.S. Philips Corporation, New York, N.Y.

[21] Appl. No.: 250,782

[22] Filed: May 27, 1994

Related U.S. Patent Documents

Reissue of:

[64] Patent No.: 5,119,102
Issued: Jun. 2, 1992
Appl. No.: 644,792
Filed: Jan. 23, 1991

[30] Foreign Application Priority Data

Feb. 28, 1990 [GB] United Kingdom ..... 9004433

[51] Int. Cl.[6] ..... H04B 7/185; G01S 5/02

[52] U.S. Cl. ..... 342/357; 342/457

[58] Field of Search ..... 342/357, 457, 342/387; 364/460, 449

[56] References Cited

U.S. PATENT DOCUMENTS

| | | | |
|---|---|---|---|
| 3,471,856 | 10/1969 | Laughlin, Jr. et al. . | |
| 3,493,970 | 2/1970 | Knauth . | |
| 3,774,215 | 11/1973 | Reed . | |
| 3,949,399 | 4/1976 | Huber et al. . | |
| 4,894,662 | 1/1990 | Counselman . | |
| 5,043,736 | 8/1991 | Darnell et al. | 342/357 |
| 5,225,842 | 7/1993 | Brown et al. . | |

FOREIGN PATENT DOCUMENTS

| | | |
|---|---|---|
| 0133807 | 3/1985 | European Pat. Off. . |
| 0250211 | 12/1987 | European Pat. Off. . |
| 0545636 | 6/1993 | European Pat. Off. . |
| 8905460 | 6/1989 | United Kingdom . |

OTHER PUBLICATIONS

B.D. Nordwall, "GPS Could Improve Sonobuoys, Radiosondes", Aviation Week & Space Technology, Oct. 18, 1993, pp. 71 and 73.

McConnell et al, "GPS Translator Tracking System Implementations at Test Ranges", IEEE 1983 National Telesystems Conference, Nov. 14–16, 1983, San Francisco, CA, pp. 239–245, 239 and 243, Figs. 1, 6 and 7.

Wells, "Translated GPS Real-Time Tracking", IEEE 1983 National Telesystems Conference, Nov. 14–16, 1983, San Francisco, CA, pp. 260–264.

*Primary Examiner*—Theodore. M. Blum
*Attorney, Agent, or Firm*—Laurie E. Gathman

[57] ABSTRACT

Signals from a number of NAVSTAR global positioning system (GPS) satellites (11,12,13,14) are received by a receiver (16) in a vehicle (15) and a segment of the signals is stored in a memory (18) prior to retransmission by a transmitter (19). A base station (35) receives these transmissions from the mobile unit using a first receiver (36). The base station also receives signals directly from the NAVSTAR GPS satellites using a second receiver (38). A control and calculating apparatus (37) within the base station can determine the ephemeris (course) information for the satellites and can measure the transmission times or propagation delays of signals between the satellites and the vehicle and with this information the control and calculating apparatus can calculate the position of the vehicle unit.

48 Claims, 3 Drawing Sheets

$$(X_1 - X)^2 + (Y_1 - Y)^2 + (Z_1 - Z)^2 = (R_1 - C_B)^2$$

$$(X_2 - X)^2 + (Y_2 - Y)^2 + (Z_2 - Z)^2 = (R_2 - C_B)^2$$

$$(X_3 - X)^2 + (Y_3 - Y)^2 + (Z_3 - Z)^2 = (R_3 - C_B)^2$$

$$(X_4 - X)^2 + (Y_4 - Y)^2 + (Z_4 - Z)^2 = (R_4 - C_B)^2$$

VEHICLE LOCATION SYSTEM

Matter enclosed in heavy brackets [ ] appears in the original patent but forms no part of this reissue specification; matter printed in italics indicates the additions made by reissue.

This invention relates to a [vehicle] *mobile equipment* location system which makes use of a satellite-based global positioning service (GPS) of the NAVSTAR type and which has particular but not exclusive application to an automatic vehicle location (AVL) system for use with a fleet of vehicles, each of which is in radio contact with a base station.

Fleets of vehicles such as messengers and taxis have traditionally kept a base station informed of their location by using speech messages from the vehicle over a radio link to an operator or controller at the base station. This technique has significant disadvantages which include errors due to mis-heard messages, distraction of the vehicle driver and the large amount of time that the operator has to spend in simply updating a map or schedule. One solution to this problem involves using an automated vehicle locating system based on the NAVSTAR satellite-based global position system (GPS).

The NAVSTAR GPS is described in "Global Positioning by Satellite" by Philip G. Mattos, Electronics and Wireless World, February 1989 but the salient points of the system are repeated here. The NAVSTAR GPS consists of a number of satellites in approximately 12 hour, inclined orbits of the earth, each satellite transmitting continuous positional information. Two positioning services are provided by NAVSTAR, the precise positioning service (PPS) which is reserved for military use and the standard positioning service (SPS) which is available for general use. The following description is confined to the SPS although some features are common to both systems. By measuring the propagation time of these transmissions and hence the distance from three satellites to himself, a user can make an accurate calculation of his position in three dimensions. To make a valid positional fix, the user needs to measure the propagation times to an accuracy of better than 100 ns and to facilitate this the satellite signals each have timing marks at approximately 1 μs intervals. However, each satellite's signals are synchronised to an atomic clock and the normal user of the system will not maintain such an accurate clock. As a result the user's clock is said to be in error (in other words, different from satellite time) by a clock bias $C_B$. By measuring the apparent satellite signal propagation times from four satellites rather than three, the redundancy can be used to solve for $C_B$ and the three accurate propagation times required can be calculated. The signal propagation times correspond to ranges of the user from the satellites related by the speed of light c. Prior to correction for the user's clock bias $C_B$, the apparent ranges of the satellites are all in error by a fixed amount and are called pseudoranges.

Figures 1, 2:
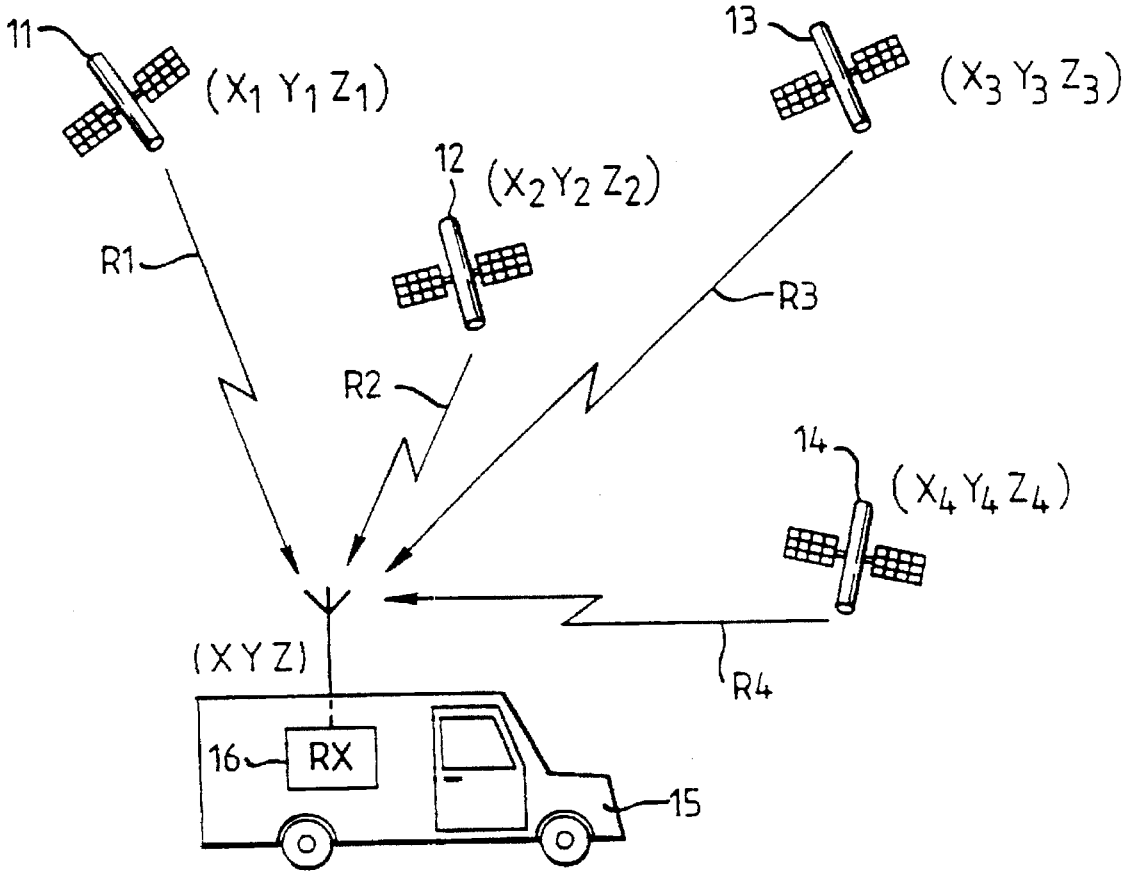

FIG. 1 of the accompanying drawings shows a radio receiver 16 in a user's vehicle 15 receiving signals from four GFS satellites 11, 12, 13 and 14. The four pseudoranges of the satellite signals are denoted R1, R2, R3 and R4. The positions of the satellites and the vehicle are shown as three-dimensional coordinates whose origin is the centre of the earth. FIG. 2 of the accompanying drawings shows the equations used by a GPS receiver to calculate the dimensional coordinates and the clock bias from a knowledge of four satellite positions and their respective pseudoranges. While it is not essential, these equations are usually solved using numerical techniques to hasten the calculations. It is important to note that the clock bias $C_B$ has the dimension metres in order to agree with the remainder of the equation. *$C_B$ has the dimension metres in order to agree with the remainder of the equation.* $C_B$ can be converted to a time *by* division by the speed of light c.

The data transmitted by each satellite consists broadly of three sets of information, the ephemeris, the almanac and the clock correction parameters. The ephemeris consists of detailed information about the satellite's own course over the next two hours, the almanac consists of less detailed information about the complete satellite constellation for a longer period and the clock correction parameters allow the user to correct for the GPS satellite's own clock errors. The satellite transmissions consist of a direct sequence spread spectrum (DSSS) signal containing the ephemeris, almanac, and the clock correction information at a rate of 50 bits per second (bps). In the case of the SPS a pseudo random noise (PRN) signal which has a chip rate of 1.023 MHz and which is unique to each satellite is used to spread the spectrum of the information, which is then transmitted on a centre frequency of 1575.42 MHz. The PRN signal is known as a coarse/acquisition (C/A) code since it provides the timing marks required for fast acquisition of GPS signals and coarse navigation. The signals received at a user's receiver have a bandwidth of approximately 2 MHz and a signal to noise ratio (S/N) of approximately −20 dB. In addition, since the satellites are each moving at a speed in excess of 3 km/s, the GPS signals are received with a Doppler frequency offset from the GPS centre frequency. As a result, a stationary GPS receiver has to be capable of receiving signals with frequencies of up to ±4 KHz from the GPS centre frequency, and a mobile receiver (as is usually the case) has to be able to receive signals over an even greater frequency range. To recover the data and measure the propagation time of the satellite signals, the GPS receiver must cancel or allow for the Doppler frequency offset and generate the C/A code relevant to each satellite. Initially, at least, this can be very time consuming since to despread the DSSS signals, the incoming and locally generated PRN codes must be exactly at synchronism. To find the PRN code delay the receiver must compare the locally generated code and the incoming code at a number of different positions until the point of synchronism or correlation is found. With a code length of 1023 chips this comparison can be a lengthy procedure. However, once the frequency offset and the PRN code delay for each satellite are known, tracing them is relatively easy.

Some considerable effort has been directed towards making more accurate location systems using the GPS. One technique for obtaining improved accuracy is to use a differential system which makes propagation time measurements for a mobile receiver and for a fixed receiver at a known location. Patent specification WO 87/06713 describes such a differential system which additionally smooths the values of propagation time over a number of measurements to obtain improved accuracy. There are numerous applications of the GPS, however, which do not require pinpoint accuracy; the operator of a fleet of vehicles, for example, will probably be satisfied with locations having an accuracy of only several hundred metres.

As can be appreciated, a receiver for use with the GPS is rather complex and hence expensive and it is the aim of the present invention to provide a considerably simplified system, based on the GPS, for locating a distant vehicle or vehicles from a fixed point.

According to a first aspect of the present invention there is provided a [vehicle] *mobile equipment* location system for use in a global positioning system (GPS), comprising at least one [vehicle mounted] *mobile* equipment including means for receiving signals directly from the GPS, a [fixedly sited] base station including first means for receiving signals directly from the GPS, characterised in that the or each [vehicle mounted] *mobile* equipment includes means for recording the received GPS signals and means for retransmitting the recorded GPS signals to the base station, and in that the [fixedly sited] base station includes second means for receiving the recorded GPS signals retransmitted by the [vehicle mounted] *mobile* equipment, and position determining means coupled to the first and second means, for determining the position of the or each [vehicle] *mobile equipment* at the time when the 171 vehicle mounted] *mobile* equipment received the GPS signals.

The maximum rate at which the retransmission of the GPS signals takes place will be determined by the capacity of the radio channel between the mobile unit(s) and the base station(s). This retransmission rate will generally be somewhat lower than the original rate of the GPS signals and at a different carrier frequency.

It is envisaged that a vehicle location system in accordance with the present invention will make use of a vehicle mounted communications transmitter that is already a part of the vehicle's equipment and also serves one or more other purposes although this is by no means essential.

The vehicle mounted equipment can make the necessary recordings of GPS dates on receipt of a request signal from a base station, at predetermined intervals, or continuously, using a first in, first out (FIFO) type of storage means. The data can be retransmitted on receipt of a request signal from a base station, upon the lapse of a given amount of time from the beginning of the recording of the data or at predetermined time intervals. To make a position fix the transition time of the stellite signals has to be known accurately and the redundancy available due to reception of four satellite signals will only resolve errors of up to a few milliseconds. A coarser measure of the signal arrival time, that is nonetheless accurate to within a few milliseconds will thus be required by the base station. One solution to this problem would be for the vehicle mounted equipment to transmit a time of arrival (TOA) signal with the recording of the satellite data. Another solution would be for the vehicle mounted equipment to record the satellite data at certain, known intervals and to retransmit the data before the commencement of the next interval. In most cases the vehicle mounted equipment will also transmit an identifying signal with the recorded satellite signals so that the base station has a knowledge of the origin of any particular signal. Where a specific mobile unit has been requested to retransmit its recorded data, this identification signal may be superflous, but its inclusion does provide a degree of extra protection in the event of receipt of corrupted request signals from the base station.

According to a second aspect of the present invention there is provided a vehicle mounted equipment for use with a vehicle location system in accordance with the first aspect of the present invention, including means for receiving GPS signals, characterised in that the equipment also includes means for recording the received GPS signals and means for retransmitting the recorded GPS signals.

According to a third aspect of the present invention there is provided a fixedly sited base station for use with the system in accordance with the first aspect of the present invention, including first means for receiving GPS signals directly from the GPS, characterised in that the base station also includes second means for receiving a retransmission of GPS signals from a vehicle mounted equipment and means coupled to said first and second means for determining the position of the vehicle mounted equipment at the time that the GPS signals were received.

Figure 3:
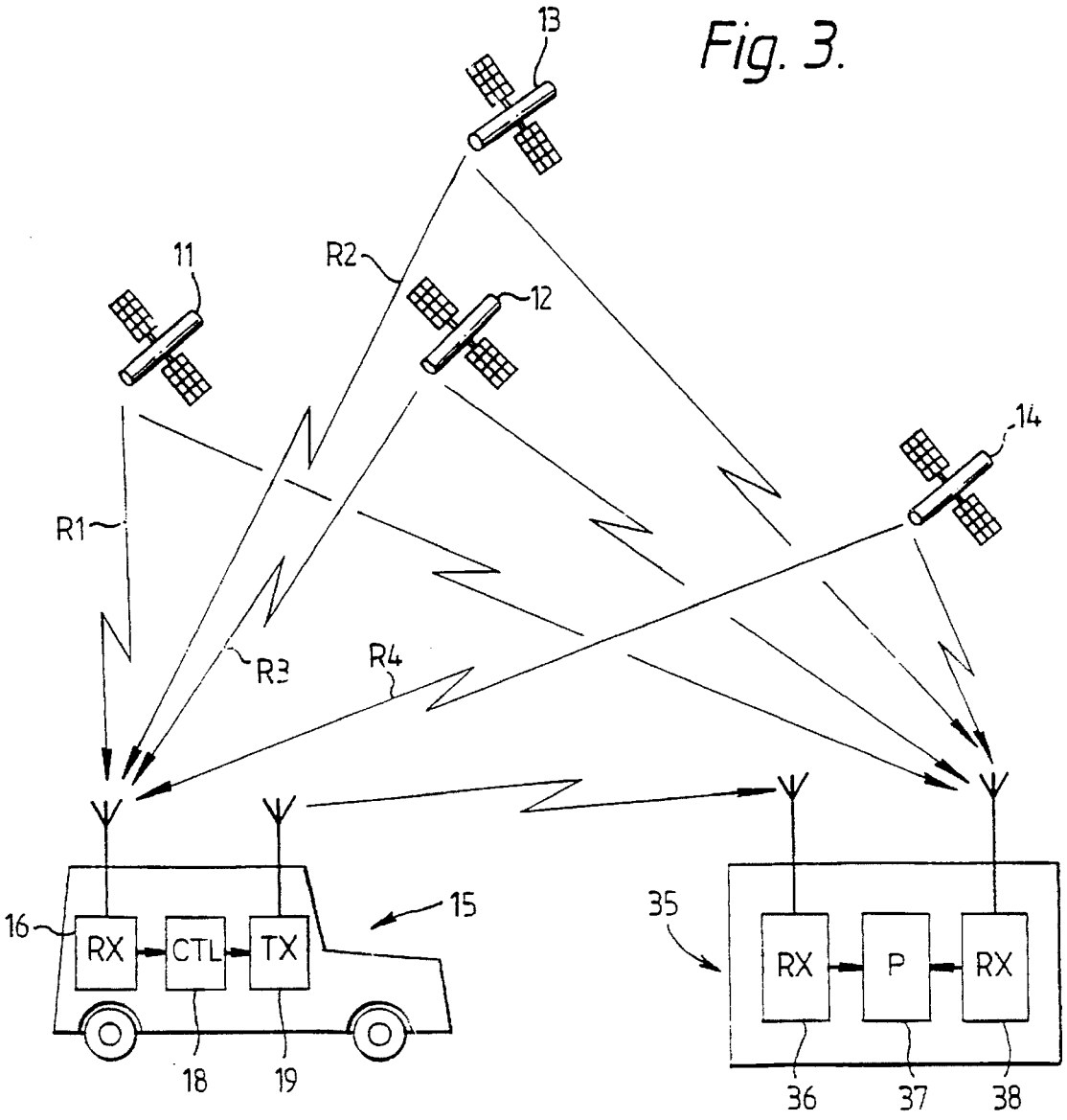
Figure 4:
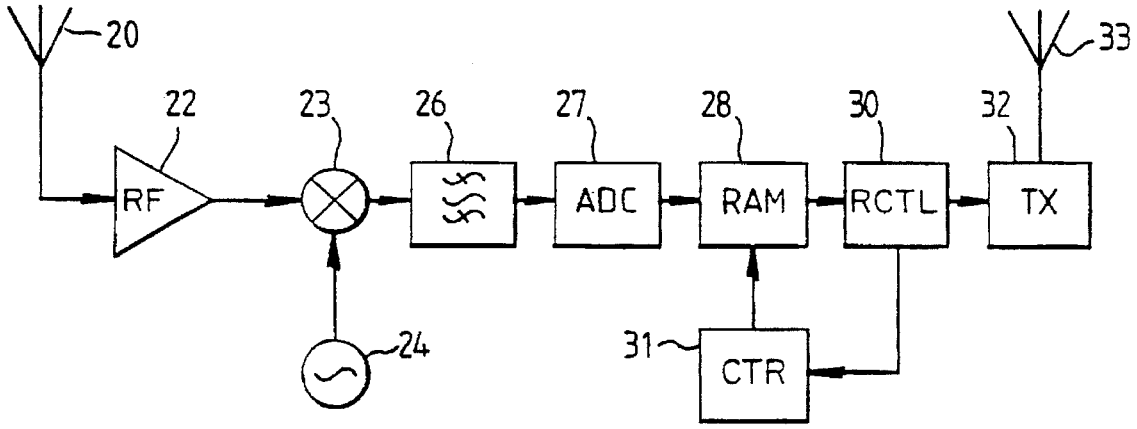
Figure 5:
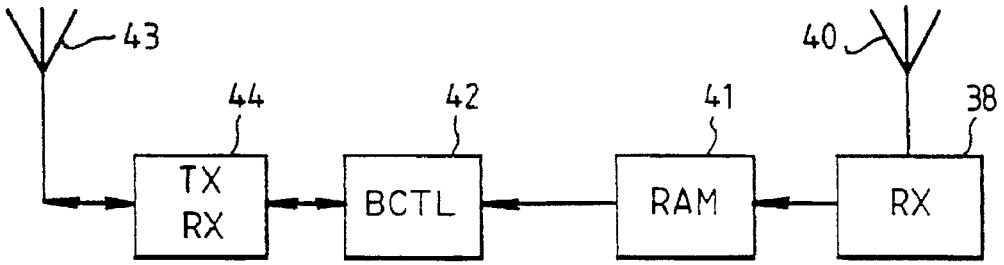

The present invention will now be described, by way of example, with reference to FIGS. 3, 4 and 5 of the accompanying drawings, wherein:

FIG. 1 shows a radio receiver in a vehicle receiving signals from four GPS satellites, FIG. 2 shows equations used by a GPS receiver for certain calculations, FIG. 3 shows signals from four NAVSTAR satellites being received by a mobile unit and retransmitted to a base station, FIG. 4 is a block schematic diagram of a receiver, data store and transmitter for a mobile unit, and FIG. 5 is a block schematic diagram of a GPS receiver, a transceiver and a data store in a base station.

In the drawings corresponding features have been identified using the same reference numerals.

FIG. 3 shows the vehicle location system operating with just one vehicle 15 and one base station 35. Transmissions from NAVSTAR GPS satellites 11, 12, 13 and 14 are received by both a vehicle mounted receiver 16 and a base station receiver 38. The GPS signals received by mobile receiver 16 are fed to a storing and control means 18 which records a short section of the satellite signals. The control means 18 might record GPS signals at preset intervals, upon receipt of a request signal (not shown) from the base station, or continuously where the stored signals at any instant will be those most recently received. The recorded signals are then retransmitted, at a lower data rate and on a different carrier frequency to that used by the satellites, by a transmipl 19 to a receiver 36 in the base station. The signals could be retransmitted at a predetermined interval after the commencement of the recording or upon receipt of a request signal from the base station. In the former case it may be necessary for the retransmitted signal to include some kind of identifier so that the base station knows from which vehicle the signals have originated. The rate at which the signals are retransmitted will depend upon the capacity of the radio channel between the mobile unit and the base station but will be approximately 1,000 times less than the rate at which they were received and sampled if a voice channel is used. The received and recorded satellite signals have a S/N ratio of approximately −20 dB and retransmission will probably not cause significant further deterioration of the S/N. As a result, it is not usually necessary to include any error detection or correction codes with the retransmitted data. The base station also includes means for receiving the GPS signals directly from the satellites using receiver 38. Signals from receiver 38 are passed to a processing means 37 which maintains a copy of the GPS ephemeris and clock correction data for those satellites currently in use by the system. The processing means 37 can, with the data received by receivers 36 and 38, calculate the position of the vehicle 15 by removing the Doppler offset frequency successively from each of the recorded satellite signals, correlating the relevant C/A code with each of the signals and calculating the satellite pseudoranges. The processing means 37 may also maintain a copy of the GPS almanac so that the vehicle location system can use the signals from the most favourable satellites and find newly visible satellites more quickly.

Two main problems can arise from this offline, remote processing of the satellite signals. Firstly, if the mobile unit is at a great distance from the base station it is possible that the base station will not be able to receive signals from a satellite that is visible to the vehicle and which is essential to the positional fix. The base station will thus be deprived of up-to-date ephemeris information for that satellite. To reduce the likelihood of this problem, the antenna for the base station GPS receiver should be omnidirectional and mounted in an area clear of obstructions. Where a very large area is to be covered, the use of a number of physically separated base stations with means for intercommunication might be the best solution. For the base station to obtain the ephemeris data from the retransmission by the mobile unit is not a practical proposition since the recording and retransmission of sufficient spread spectrum data to provide a complete satellite ephemeris would take several hours. Secondly, there is a range ambiguity problem that, while present in a conventional vehicle mounted GPS receiver system, may be more difficult to solve in this case. The PRN codes used by the satellites repeat every millisecond and as a result the circular correlation of the received and locally generated PRN codes only allows a GPS receiver to calculate the submillisecond part of the satellite signal transit time. The integer number of milliseconds in the signal transit times can usually be calculated from the approximate position of the vehicle. Since a 1 millisecond difference in transit time corresponds to a difference in the satellite pseudorange of 300 km. a knowledge of the vehicle position to within approximately 100 km will allow the calculation of the integer number of milliseconds in the signal transit times. This degree of accuracy of the vehicle position may be available from a knowledge of which [call] *cell* of a cellular radio system is being used to retransmit the signals to the base station. If the vehicle position is not known to this degree of accuracy (100 km may be less than one hour's motoring) the data bit edges on the satellite signals can act as timing marks with a spacing of 20 ms. Since the modulation of the satellite signal by the data is synchronised to an atomic clock, the position of the data bit edges in the received, despread signals gives a coarse measure of transit time which is nonetheless accurate to within one millisecond. To use this measurement technique, at least 20 ms of satellite signals will need to be recorded to ensure that the recording contains a data bit edge from each satellite. A third alternative is to use the Doppler shift on the received GPS signals to calculate an approximate user position. However, this method still requires at least 20 ms of satellite data and is mathematically more complex, especially if the user's vehicle is in motion.

FIG. 4 is a block schematic diagram of a mobile receiver and transmitter suitable for use in a vehicle locating system in accordance with the present invention. Satellite signals are received at an antenna 20 which feeds an rf amplifier 22. The input stage of the rf amplifier 22 will usually include a bandpass filter. The output of the amplifier 22 is mixed with the output of local oscillator 24 in a mixer 23 and the output of the mixer is filtered by a bandpass filter 26. Although only one down-conversion stage is shown, the front end of the receiver could include two or more such stages. The nominal intermediate frequency to which the satellite signals are mixed down could be anything from zero to several MHz. In the case of a zero IF receiver, the filter 26 would be a low pass type. The output of filter 26 is digitised in an analogue to digital converter 27 whose sampling rate is determined by the Nyquist sampling criterion.

The output of the analogue to digital converter 27 is stored in a random access memory (RAM) 28 which is addressed by a counter 31, the counter itself being under the control of a receiver controller 30. The size of this RAM will be determined by the rate of sampling and the length of time that the incoming satellite signals are to be recorded for. For example, sampling at 2.046 MHz (to satisfy the Nyquist criterion) for 8 ms will require just under 16 kbits of memory. The contents of the RAM 28 are transmitted serially by transmitter 32 via antenna 33. In a practical system the transmitter 32 may be part of an existing transceiver within the mobile unit.

These signals are received and processed by the base station, an embodiment of which is shown in block schematic form in FIG. 5. The retransmitted signals from the mobile unit are received by antenna 43 and fed to a transceiver 44. Again, the transceiver 44 could be part of an existing communications link. A base station controller 42 is connected to the transceiver and in addition to receiving the signals from the mobiles and calculating their positions it maintains an up to date copy of the ephemeris data for all the satellites currently in view. The GPS signals are received by a GPS receiver 38 via an antenna 40. The purpose of this receiver is to decode satellite ephemeris and clock correction data and it will probably also decode almanac data to facilitate satellite signal acquisition. Since positional information is not required for the base station it does not need to determine the propagation delays of the GPS signals. It is thus possible to use a signal despreading technique based on non-coherent demodulation which does not use any logically generated C/A codes. In all other respects the satellite data is received as described previously for a conventional system and stored in a RAM 41 for use by the base station controller 42 in calculating the satellite pseudoranges in respect of the or each vehicle. One advantage of using a complete GPS receiver at the base station rather than one employing a non-coherent demodulation technique is that it permits location fixes to be made by a differential technique. The base station uses the GPS to determine its own position and, since this is already known accurately, can calculate an up to date error term for the GPS. When the mobile unit(s) position is calculated, this error can be removed from the mobile unit's pseudoranges which gives an improvement in the accuracy of the positional fix. The transceiver 44 enables request signals to be passed from the base station to the mobile units for commencement of data logging and/or data transmission. It can also, if required, relay vehicle position or directions back to the driver of the vehicle.

From reading the present disclosure other modifications will be apparent to persons skilled in the art. Such modifications may involve other features which are already known in the design, manufacture and use of GPS systems and component parts thereof and which may be used instead of or in addition to features already described herein. Athough claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A vehicle location system for use in a global positioning system (GPS), comprising at least one vehicle mounted equipment including means for receiving signals directly from the GFS, a fixedly sited base station including first means for receiving signals directly from the GPS, characterised in that the vehicle mounted equipment includes means for recording the received GPS signals and means for retransmitting the recorded GPS signals to the base station, and in that the fixedly sited base station includes second means for receiving the recorded GPS signals retransmitted by the vehicle mounted equipment, and position determining means coupled to the first and second receiving means for determining the position of the vehicle at the time when the vehicle mounted equipment received the GPS signals.

2. A vehicle location system as claimed in claim 1, wherein the vehicle mounted equipment transmits a time of arrival (TOA) signal in addition to retransmitting the recorded GPS signals.

3. A vehicle location system as claimed in claim 1 wherein the rate at which the vehicle mounted equipment retransmits the GPS signals is lower than that at which the signals were recorded.

4. A vehicle location system as claimed in claim 3, wherein the vehicle mounted equipment further comprises control means coupled to the recording means such that signals from the control means cause the recording means to record the GPS signals at preset intervals.

5. A vehicle location system as claimed in claim 2, wherein the GPS is the satellite-based NAVSTAR GPS, and in that the base station has means for obtaining the GPS ephemeris for the satellites in use.

6. A vehicle location system as claimed in claim 5, wherein the means for obtaining the GPS ephemeris in the base station has means for despreading the NAVSTAR GPS signals without using any locally generated pseudo random noise codes.

7. A vehicle mounted equipment for use *in a global positioning system (GPS)* with [the system as claimed in claim 1] *a vehicle location system and* including means for receiving [the] GPS signals, [wherein the equipment also includes] *the vehicle location system comprising a fixedly sited base station including first means for receiving signals directly from the GPS, second means for receiving recorded GPS signals transmitted by the vehicle mounted equipment, and position determining means coupled to the first and second receiving means for determining the position of the vehicle at the time when the vehicle mounted equipment received the GPS signals, said vehicle mounted equipment including* means for recording the received GPS signals and means for retransmitting the recorded GPS signals.

8. A vehicle mounted equipment for use *in a global positioning system (GPS)* with [the system as claimed in claim 2] *a vehicle location system and* including means for receiving [the] GPS signals, [wherein the equipment includes] *the vehicle location system comprising a fixedly sited base station including first means for receiving signals directly from the GPS, second means for receiving recorded GPS signals transmitted by the vehicle mounted equipment, and position determining means coupled to the first and second receiving means for determining the position of the vehicle at the time when the vehicle mounted equipment received the GPS signals, said vehicle mounted equipment including* means for recording the received GPS signals and means for retransmitting the recorded GPS signals and a time of arrival (TOA) signal.

9. A fixedly sited base station for use *in a global positioning system (GPS)* with [the system as claimed in claim 1] *a vehicle location system comprising at least one vehicle mounted equipment including means for receiving signals directly from the GPS, means for recording the received GPS signals, and means for retransmitting the recorded GPS signals to the base station, said fixedly sited base station* including first means for receiving GPS signals directly from the GPS, [wherein the base station also includes] second means for receiving a retransmission of GPS signals from [a] *the* vehicle mounted equipment and means coupled to said first and second receiving means for determining the position of the vehicle mounted equipment at the time the GPS signals were received.

10. A fixedly sited base station as claimed in claim 9, wherein the means for determining the position of the vehicle mounted equipment calculates the position of the base station using the GPS and then calculates the position of the vehicle mounted equipment using a differential technique.

11. A vehicle location system as claimed in claim 2, wherein the rate at which the vehicle mounted equipment retransmits the GPS signals is lower than that at which the signals were recorded.

12. A vehicle location system as claimed in claim 11, wherein the vehicle mounted equipment further comprises control means coupled to the recording means such that signals from the control means cause the recording means to record GPS signals at preset intervals.

13. A vehicle location system as claimed in claim 2, wherein the vehicle mounted equipment further comprises control means coupled to the recording means such that signals from the control means cause the recording means to record GPS signals at preset intervals.

14. A vehicle location system as claimed in claim 1, wherein the vehicle mounted equipment further comprises control means coupled to the recording means such that signals from the control means cause the recording means to record GPS signals at preset intervals.

15. A vehicle location system as claimed in claim 1, wherein the base station includes a means for obtaining the GPS ephemeris for satellites of the GPS.

*16. A vehicle location system as claimed in claim 1, wherein the means for determining the position of the vehicle mounted equipment calculates the position of the base station using the GPS and then calculates the position of the vehicle mounted equipment using a differential technique.*

*17. A mobile equipment location system for use in a global positioning system (GPS), comprising at least one mobile equipment including means for receiving signals directly from the GPS, a base station including first means for receiving signals directly from the GPS, characterized in that the mobile equipment includes means for recording the received GPS signals and means for retransmitting the recorded GPS signals to the base station, and in that the base station includes second means for receiving the recorded GPS signals retransmitted by the mobile equipment, and position determining means coupled to the first and second receiving means for determining the position of the mobile equipment at the time when the mobile equipment received the GPS signals.*

*18. A mobile equipment location system for use in a global positioning system (GPS), comprising at least one mobile equipment including means for receiving signals directly from the GPS, a base station at a known, location, including first means for receiving signals directly from the GPS, characterised in that the mobile equipment includes means for recording the received GPS signals and means for retransmitting the recorded GPS signals to the base station, and in that the base station includes second means for receiving the recorded GPS signals retransmitted by the mobile equipment, and position determining means coupled*

*to the first and second receiving means for determining the position of the mobile equipment at the time when the mobile equipment received the GPS signals.*

*19. A mobile equipment location system as claimed in claim 17, wherein the mobile equipment transmits a time of arrival (TOA) signal in addition to retransmitting the recorded GPS signals.*

*20. A mobile equipment location system as claimed in claim 17, wherein the rate at which the mobile equipment retransmits the GPS signals is lower than that at which the signals were recorded.*

*21. A mobile equipment location system as claimed in claim 20, wherein the mobile equipment further comprises control means coupled to the recording means such that signals from the control means cause the recording means to record the GPS signals at preset intervals.*

*22. A mobile equipment location system as claimed in claim 19, wherein the GPS is the satellite-based NAVSTAR GPS, and in that the base station has means for obtaining the GPS ephemeris for the satellites in use.*

*23. A mobile equipment location system as claimed in claim 22, wherein the means for obtaining the GPS ephemeris in the base station has means for despreading the NAVSTAR GPS signals without using any locally generated pseudo random noise codes.*

*24. A mobile equipment for use in a global positioning system (GPS) with a mobile equipment location system and including means for receiving GPS signals, the mobile equipment location system comprising a base station including first means for receiving signals directly from the GPS, second means for receiving recorded GPS signals transmitted by the mobile equipment, and position determining means coupled to the first and second receiving means for determining the position of the mobile equipment at the time when the mobile equipment received the GPS signals, said mobile equipment including means for recording the received GPS signals and means for retransmitting the recorded GPS signals.*

*25. A mobile equipment for use in a global positioning system (GPS) with a mobile equipment location system and including means for receiving GPS signals, the mobile equipment location system comprising a base station including first means for receiving signals directly from the GPS, second means for receiving recorded GPS signals transmitted by the mobile equipment, and position determining means coupled to the first and second receiving means for determining the position of the mobile equipment at the time when the mobile equipment received the GPS signals, said mobile equipment including means for recording the received GPS signals and means for retransmitting the recorded GPS signals and a time of arrival (TOA) signal.*

*26. A base station for use in a global positioning system (GPS) with a mobile equipment location system comprising at least one mobile equipment including means for receiving signals directly from the GPS, means for recording the received GPS signals, and means for retransmitting the recorded GPS signals to the base station, said base station including first means for receiving GPS signals directly from the GPS, second means for receiving a retransmission of GPS signals from the mobile equipment and means coupled to said first and second receiving means for determining the position of the mobile equipment at the time the GPS signals were received.*

*27. A base station as claimed in claim 26, wherein the means for determining the position of the mobile equipment calculates the position of the base station using the GPS and then calculates the position of the mobile equipment using a differential technique.*

*28. A mobile equipment location system as claimed in claim 19, wherein the rate at which the mobile equipment retransmits the GPS signals is lower than that at which the signals are recorded.*

*29. A mobile equipment location system as claimed in claim 28, wherein the mobile equipment further comprises control means coupled to the recording means such that signals from the control means cause the recording means to record GPS signals at preset intervals.*

*30. A mobile equipment location system as claimed in claim 19, wherein the mobile equipment further comprises control means coupled to the recording means such that signals from the control means cause the recording means to record GPS signals at preset intervals.*

*31. A mobile equipment location system as claimed in claim 17, wherein the mobile equipment further comprises control means coupled to the recording means such that signals from the control means cause the recording means to record GPS signals at preset intervals.*

*32. A mobile equipment location system as claimed in claim 17, wherein the base station includes a means for obtaining the GPS ephemeris for satellites of the GPS.*

*33. A mobile equipment location system as claimed in claim 18, wherein the mobile equipment transmits a time of arrival (TOA) signal in addition to retransmitting the recorded GPS signals.*

*34. A mobile equipment location system as claimed in claim 18, wherein the rate at which the mobile equipment retransmits the GPS signals is lower than that at which the signals were recorded.*

*35. A mobile equipment location system as claimed in claim 34, wherein the mobile equipment further comprises control means coupled to the recording means such that signals from the control means cause the recording means to record the GPS signals at preset intervals.*

*36. A mobile equipment location system as claimed in claim 33, wherein the GPS is the satellite-based NAVSTAR GPS, and in that the base station has means for obtaining the GPS ephemeris for the satellites in use.*

*37. A mobile equipment location system as claimed in claim 36, wherein the means for obtaining the GPS ephemeris in the base station has means for despreading the NAVSTAR GPS signals without using any locally generated pseudo random noise codes.*

*38. A mobile equipment for use in a global positioning system (GPS) with a mobile equipment location system and including means for receiving GPS signals, the mobile equipment location system comprising a base station at a known location including first means for receiving signals directly from the GPS, second means for receiving recorded GPS signals transmitted by the mobile equipment, and position determining means coupled to the first and second receiving means for determining the position of the mobile equipment at the time when the mobile equipment received the GPS signals, said mobile equipment including means for recording the received GPS signals and means for retransmitting the recorded GPS signals.*

*39. A mobile equipment for use in a global positioning system (GPS) with a mobile equipment location system and including means for receiving GPS signals, the mobile equipment location system comprising a base station at a known location including first means for receiving signals directly from the GPS, second means for receiving recorded GPS signals transmitted by the mobile equipment, and position determining means coupled to the first and second receiving means for determining the position of the mobile equipment at the time when the mobile equipment received*

*the GPS signals, said mobile equipment including means for recording the received GPS signals and means for retransmitting the recorded GPS signals and a time of arrival (TOA) signal.*

*40. A base station at a known location for use in a qlobal positioning system (GPS) with a mobile equipment location system comprising at least one mobile equipment including means for receiving signals directly from the GPS, means for recording the received GPS signals, and means for retransmitting the recorded GPS signals to the base station, said base station including first means for receiving GPS signals directly from the GPS, second means for receiving a retransmission of GPS signals from the mobile equipment and means coupled to said first and second receiving means for determining the position of the mobile equipment at the time the GPS signals were received.*

*41. A base station as claimed in claim 40, wherein the means for determining the position of the mobile equipment calculates the position of the base station using the GPS and then calculates the position of the mobile equipment using a differential technique.*

*42. A mobile equipment location system as claimed in claim 33, wherein the rate at which the mobile equipment retransmits the GPS signals is lower than that at which the signals are recorded.*

*43. A mobile equipment location system as claimed in claim 42, wherein the mobile equipment further comprises control means coupled to the recording means such that signals from the control means cause the recording means to record GPS signals at preset intervals.*

*44. A mobile equipment location system as claimed in claim 33, wherein the mobile equipment further comprises control means coupled to the recording means such that signals from the control means cause the recording means to record GPS signals at preset intervals.*

*45. A mobile equipment location system as claimed in claim 18, wherein the mobile equipment further comprises control means coupled to the recording means such that signals from the control means cause the recording means to record GPS signals at preset intervals.*

*46. A mobile equipment location system as claimed in claim 18, wherein the base station includes a means for obtaining the GPS ephemeris for satellites of the GPS.*

*47. A mobile equipment location system as claimed in claim 17, wherein the means for determining the position of the mobile equipment calculates the position of the base station using the GPS and then calculates the position of the mobile equipment using a differential technique.*

*48. A mobile equipment location system as claimed in claim 18, wherein the means for determining the position of the mobile equipment calculates the position of the base station using the GPS and then calculates the position of the mobile equipment using a differential technique.*

* * * * *